3,396,039
PUMPABLE STABILIZER-EMULSIFIER INCORPORATING READILY DISPERSIBLE HYDROPHILIC COLLOIDS
Albert J. Leo, La Grange Park, and Edward Bielskis, Chicago, Ill., assignors to National Pectin Products Company, Chicago, Ill., a corporation of Illinois
No Drawing. Filed Sept. 29, 1965, Ser. No. 491,421
7 Claims. (Cl. 99—136)

ABSTRACT OF THE DISCLOSURE

Preparation of a stabilizer-emulsifier for foodstuffs by heating a mixture of water, and edible solvent and a monoglyceride, adding a fully divided hydrophilic colloid thereto and homogenizing the entire mixture.

---

This invention relates to a stabilizer-emulsifier that is useful in such food products as ice cream mix, sherbet mix, cottage cheese dressing and the like; and the invention concerns, more particularly, a stabilizer-emulsifier which is pumpable and in which is incorporated a finely divided undissolved hydrophilic colloid that is so dispersed through the stabilizer-emulsifier as to be readily soluble and dispersible when the stabilizer-emulsifier is admixed with an aqueous end-product mix.

It is well known that finely pulverized hydrophilic colloids are difficult to dispersed in water, and such dispersion difficulties have limited some of the applications of such colloids, as is attested by a substantial body of technical and patent literature. Any discussion of this subject might well begin by distinguishing between the terms "dispersibility" and "solubility," inasmuch as the failure of some authors to distinguish between these terms has resulted in some confusion in the literature. A colloid is "dispersed" in water or other liquid when each particle of the colloid is separated from all others by an excess of the solvent. A hydrophilic colloid is "dissolved" when it has absorbed as much water as it is capable of holding at the prevailing temperature.

Dispersibility of a hydrophilic colloid is affected mainly by two factors: the degree of water affinity of the colloid, and its particle size. With increasing rate of water affinity or solubility, dispersibility normally decreases. As particles of the colloid absorb water, they swell and become gummy and adhesive, so that either agitation or settling of the particles in water causes them to engage and adhere to one another and thus rapidly build into lumps. The bound water in the particles at the surface of each lump prevents the penetration of free water through the wetted skin which such particles form, and particles at the interior of the lump therefore remain substantially dry, so that the lump as a whole is insoluble and undispersible.

If the water can be made to flow between all of the particles and separate them before they become tacky or gummy through swelling, complete dispersion can take place. This has heretofore been accomplished in either of two ways: (1) using particles of larger size, having proportionately less surface area exposed to the solvent and therefore offering larger interstitial space for solvent penetration, or (2) coating the particle surface with a substance which retards solution and allows time for the particles to be separated and dispersed by agitation before they become tacky.

The two expedients just mentioned are obviously unsatisfactory in situations where a high rate of solubility is required, as for example stabilizers used with dairy products subjected to high-temperature short-time pasteurization. In such cases there has generally been employed the expedient of preseparating the hydrophilic colloidal particles with a nonaqueous medium. As one approach to such preseparation, the colloidal particles were admixed with an excess of a dry, easily soluble substance such as sugar. This had the disadvantage of adding undesirable bulk to the product. Another approach was to mix the dry colloid particles into a non-aqueous liquid in which the colloid did not swell or become tacky. In such a mixture the liquid slurry had a tendency to settle and become nonuniform unless it was thickened to a degree which made it difficult to handle.

The present invention has for its object to provide a thixotropic suspension of a finely divided hydrophilic colloid, or hydrophilic colloids, in a nonaqueous liquid.

In general, the hydrophilic colloids with which this invention is concerned are cellulose gums, locust gum, guar gum, karaya gum, gum arabic, carrageenin, salts of alginic acid, alginate, pectin, and the like.

More particularly the invention has as its object to provide a stabilizer-emulsifier comprising finely divided hydrophilic colloid, or hydrophilic colloids, and hydrates of high melting point monoglycerides, which stabilizer-emulsifier is thixotropic, and therefore pumpable, so that it can be used in automatic batching and mixing equipment, is stable, and has its colloid particles dispersed and in a condition to dissolve readily when the stabilizer-emulsifier is admixed with an aqueous end-product mix.

The present invention rests upon the discovery of the thixotropic nature of a system comprising the hydrate of a high-melting distilled monoglyceride and a nonaqueous suspension of a hydrophilic colloid in a liquid which does not cause swelling or tackiness of the colloid; and also upon the discovery that (contrary to what might be expected) hydrophilic colloids suspended in such a system do not "pull" water away from the monoglyceride hydrate, so that such systems are stable and remain in their thixotropic state through extended periods of storage.

The term "thixotropic" is herein employed in its usual sense, as denoting the property exhibited by some gels of becoming fluid when subjected to internal shear. A familiar example of a thixotropic system is latex paint, which appears gel-like when at rest but which flows smoothly and exhibits liquid-like properties when subjected to internal shear forces due to agitation by a brush or roller with which it is applied. The thixotropic stabilizer-emulsifier of this invention is pumpable in the sense that it can be transferred by means of equipment of the type used, for example, in pumping lubricant greases.

In general the method of this invention comprises the following steps. To a mixture of water and propylene glycol or similar organic solvent, distilled monoglycerides are added. The ratio of water to monoglyceride in the mixture should not be less than about one to ten nor greater than about three to one, and the monoglyceride should include some high-melting monoglyceride, having a melting point of at least about 130° F., and having an α-monoglyceride content of at least 90%. The mixture is heated to melt the monoglycerides. This produces a clear solution. Heating can then be terminated. An additional quantity of propylene glycol, about equal to that first used, is then added slowly to the mixture with good agitation. Agitation is continued at least until the monoglyceride hydrate passes into a fine crystalline stage, denited by opaqueness of the mixture.

There are of course other methods (which will be readily apparent to those skilled in the art) of preparing the hydrate of a distilled monoglyceride in the form of microfine crystals distributed throughout an organic solvent. The choice of method will of course depend upon the kind of equipment available, but that which has just been described will be found generally convenient.

Preferably agitation is continued after the crystalline stage is reached, and in the presence of air or an inert gas such as nitrogen or carbon dioxide, to "cream" the mixture. At this point a finely pulverized hydrophilic colloid (or a mixture of such colloids) is added to the mixture, after which the semi-fluid mixture can be run through a colloid mill or homogenizer and then into containers.

Additional details concerning the stabilizer-emulsifier of this invention and the method of making the same will be apparent from the following specific examples:

EXAMPLE I.—STABILIZER-EMULSIFIER FOR ICE CREAM MIX

| Ingredients: | Percent by weight |
|---|---|
| Distilled monoglyceride (M.P.=155° F.; at least 90% $\alpha$-mono content) | 2.0 |
| Distilled monoglyceride (M.P.=70°–80° F.) | 15.0 |
| Water | 4.0 |
| Polysorbate 80 | 5.0 |
| CMC 7H X P | 23.0 |
| Guar gum (−200 mesh) | 8.0 |
| Carrageenin (−200 mesh) | 4.5 |
| Propylene glycol (USP) | 38.5 |
| | 100.0 |

The water called for is mixed with one-half of the propylene glycol and heated to 160° F. The distilled monoglycerides are added and heating is continued until a clear solution results. At that point heating can be terminated. The balance of the propylene glycol is added slowly with good agitation, and the agitation is continued through the crystallization stage, which is manifested by opacity of the mixture, the agitation preferably being at such a rate as to incorporate the proper amount of air or other inert gas during this "creaming" step. Next the polysorbate 80 is added, followed by the mixture of finely pulverized colloids. The semi-fluid mixture is then run through a colloid mill or homogenizer and then into containers.

As an alternative procedure, one-half of the propylene glycol can be mixed with the water and heated to 160° F.; and the distilled monoglycerides are melted therein. The balance of the propylene glycol, into which has been mixed the polysorbate 80, is then slowly added, maintaining the temperature slightly above the crystallizing point of the monoglycerides. This mixture is then pumped through a continuous cooling device which has facilities for mixing in a controlled amount of air or an inert gas. A Votator is suitable for this purpose. The mixture should be withdrawn from the cooling device at approximately 85° to 90° F., at which point the mixture of dry colloids may be added either on a continuous or a batch basis.

EXAMPLE II.—STABILIZER-EMULSIFIER FOR SOFT-SERVE MIX

| | |
|---|---|
| Monoglyceride ($\alpha$-monoglyceride=60%; M.P. =90°–100° F.) | 14.0 |
| Monoglyceride ($\alpha$-monoglyceride=at least 90%; M.P.=155° F.) | 5.0 |
| Polysorbate 65 | 4.0 |
| Polysorbate 80 | 5.0 |
| Water | 2.0 |
| CMC H X P | 20.0 |
| Guar gum (−200 mesh) | 5.0 |
| Carrageenin (−200 mesh) | 7.0 |
| Propylene glycol (USP) | 39.0 |
| | 100.0 |

Either of the procedures of Example I may be used.

EXAMPLE III.—STABILIZER-EMULSIFIER FOR SHERBET MIX

| | |
|---|---|
| Locust bean gum | 35.0 |
| Guar gum | 8.0 |
| Monoglyceride ($\alpha$-monoglyceride=at least 90%; M.P.=155° F.) | 8.0 |
| Polysorbate 80 | 5.0 |
| Water | 2.0 |
| Propylene glycol | 42.0 |
| | 100.0 |

Again, either of the procedures laid down in Example I can be followed.

It is important to note that normal monoglyceride having a 55% to 60% $\alpha$-monoglyceride content will not form a gel consisting of micro-fine crystals distributed throughout an organic solvent, as required in the product and process of this invention, and that the monoglyceride must be a distilled monoglyceride having an $\alpha$-monoglyceride content of at least 90%.

The hydrate formed from the high melting point (over 130° F.) monoglycerides imparts the desired thixotropic viscosity at very low concentrations. In some stabilizer-emulsifier combinations the emulsifier plays a relatively minor roll, and should be present in proportionate smaller amount. In such cases the low-melting distilled monoglyceride can be dispensed with and the high-melting type used exclusively.

Where the emulsifier is not important, the polysorbate can also be used in a smaller amount or even dispensed with. An excessive amount of polysorbate has been found to destabilize the thixotropic gel and cause it to "break" or separate. When a low total emulsifier content is used, the colloid concentration can usually be raised to 45% or even more.

For products such as hardened ice milk mix, in which a relatively high proportion of emulsifier is desirable to impart "dryness" at the freezer, the total emulsifier percentage may be as high as 25%, and very little of the high melting point distilled monoglyceride is needed.

An increase in the proportion of propylene glycol renders the stabilizer-emulsifier more easily pumpable, but for economic reasons the proportion of propylene glycol is kept as low as feasible since it performs no function in the end product for which the stabilizer-emulsifier is used.

The incorporation of finely subdivided gas has a very marked and desirable effect upon the pumpability and dispersability of stabilizer-emulsifiers of this invention. Inert gas is preferable to air where long storage is contemplated, since most of the stabilizer-emulsifiers embodying this invention will contain an oxidizable fatty derivative. A minimum of 10 percent of gas by volume is required before any pronounced effect from the presence of the gas is noted, and an upper limit of about 35 to 40 percent is set by practical considerations of container size and inability of the mixture to retain higher percentages of gas over prolonged periods of storage.

It will be seen that formulations embodying the principles of this invention are capable of wide variation. It will be evident to those skilled in the art that with such variations, preparations suitable for stabilizing and emulsifying a wide variety of food products can be prepared, always bearing in mind that any particular formulation should be proper for the particular end product for which it is intended, and should be so balanced, in accordance with the criteria set forth above, as to have the desired consistency for pumping and to be stable under normal storage conditions.

What is claimed as our invention is:

1. A pumpable stabilizer-emulsifier comprising a thixotropic mixture of:
   (A) a finely divided hydrophilic colloid;
   (B) an edible liquid in which the colloid neither swells nor becomes tacky, in an amount sufficient to suspend the colloid; and (C) a hydrate of a distilled monoglyceride having an α-monoglyceride content of at least 90 percent and a melting point of at least about 130° F., and which hydrate is in the form of fine crystals, said crystals and the particles of the colloid being substantially uniformly dispersed through the mixture.

2. A substantially thixotropic stabilizer-emulsifier comprising a mixture of:
(A) a finely divided hydrophilic colloid;
(B) an edible liquid in which the colloid neither swells nor becomes tacky and in which the colloid is suspended; and
(C) a hydrate of a distilled monoglyceride consisting of at least 90 percent α-monoglyceride and a melting point of at least about 130° F., and in which hydrate the ratio of water to monoglyceride is between one to ten and three to one, said monoglyceride hydrate being in the form of fine crystals substantially uniformly dispersed through the mixture.

3. The stabilizer-emulsifier of claim 2, in which distilled monoglyceride having a melting point of at least 150° F. comprises at least 1.5 percent of the total ingredient content of the mixture.

4. The stabilizer-emulsifier of claim 2 having a finely divided non-toxic gas admixed therewith and dispersed therethrough to the extent of between 10 percent and 40 percent by volume.

5. The stabilizer-emulsifier combination of claim 2, further comprising:
an admixed quantity of an emulsifier selected from the class which comprises the polyoxyethylene sorbitan esters and the monoglycerides.

6. The method of producing a pumpable stabilizer-emulsifier which comprises:
(A) producing a hydrate of a distilled monoglyceride which is in the form of fine crystals distributed throughout an edible organic solvent, by making a mixture of water, said solvent and a distilled monoglyceride having an α-monoglyceride content of at least 90 percent and a melting point of at least about 130° F., the ratio of water to monoglyceride in said mixture being not greater than three to one, and heating said mixture to the point of melting the monoglyceride; and
(B) stirring into said mixture a finely divided hydrophilic colloid which does not swell or become tacky in said organic solvent.

7. The method of claim 6, further characterized by:
admixing at least 10% by volume of a non-toxic gas with the hydrated monoglyceride by agitation to disperse the gas substantially uniformly therethrough, in a finely subdivided state.

References Cited
UNITED STATES PATENTS

| | | | |
|---|---|---|---|
| 2,935,408 | 5/1960 | Steinitz | 99—129 |
| 3,216,829 | 11/1965 | Hansen | 99—136 |

OTHER REFERENCES

"Myverol Distilled Monoglycerides," Eastman Kodak Co., Distillation Products Industries Div., pp. 7–9, 1955–1958.

RAYMOND N. JONES, *Primary Examiner.*

J. M. HUNTER, *Assistant Examiner.*

UNITED STATES PATENT OFFICE
CERTIFICATE OF CORRECTION

Patent No. 3,396,039                      August 6, 1968

Albert J. Leo et al.

It is certified that error appears in the above identified patent and that said Letters Patent are hereby corrected as shown below:

Column 1, line 29, "dispersed" should read -- disperse --.
Column 2, line 18, after "acid," insert -- propylene glycol --; lines 63 and 64, "denited" should read -- denoted --.

Signed and sealed this 13th day of January 1970.

(SEAL)
Attest:

Edward M. Fletcher, Jr.                  WILLIAM E. SCHUYLER, JR.
Attesting Officer                           Commissioner of Patents